United States Patent
Chiang et al.

(10) Patent No.: US 6,517,797 B1
(45) Date of Patent: Feb. 11, 2003

(54) PROCESS FOR SEPARATION OF $NO_x$ FROM $N_2O$ IN A MIXTURE

(75) Inventors: Chen-Chou Chiang, Wexford, PA (US); Toan P. Vo, Pittsburgh, PA (US)

(73) Assignee: Calgon Carbon Corporation, Pittsburgh, PA (US)

( * ) Notice: Subject to any disclaimer, the term of this patent is extended or adjusted under 35 U.S.C. 154(b) by 853 days.

(21) Appl. No.: 08/806,912

(22) Filed: Feb. 26, 1997

(51) Int. Cl.[7] ................ C01B 21/22; B01D 53/04
(52) U.S. Cl. ............ 423/400; 95/129; 423/239.1; 423/402
(58) Field of Search .................. 423/234, 235, 423/239.1, 400, 402; 95/129

(56) References Cited

U.S. PATENT DOCUMENTS 5,750,084 A * 5/1998 Tsutsumi et al. ........ 423/239.1

* cited by examiner

*Primary Examiner*—Wayne A. Langel
(74) *Attorney, Agent, or Firm*—Cohen & Grigsby, P.C.

(57) ABSTRACT

The present invention is a reactive adsorption process for separating $NO_x$ (NO and $NO_2/N_2O_4$) from $N_2O$ in a mixture. The process comprises (A) selectively converting NO to $NO_2/N_2O_4$ in a mixture with an oxidant and (B) selectively adsorbing $NO_2/N_2O_4$ from the mixture by an adsorbent and © recovering a stream of $N_2O$ having a substantially reduced $NO_x$ concentration. The adsorbed $NO_x$ can be recovered from the adsorbent by elevated temperature, reduced pressure, inert gas purge, water wash or any combination thereof.

38 Claims, No Drawings

PROCESS FOR SEPARATION OF $NO_x$ FROM $N_2O$ IN A MIXTURE

FIELD OF THE INVENTION

The present invention relates to a reactive adsorption process for separating $N_2O$ from a mixture that includes other nitrogen oxides ("$NO_x$") including NO and $NO_2/N_2O_4$ and, in particular to a process for selectively converting NO in a mixture by an oxidant to $NO_2/N_2O_4$, which is selectively adsorbed from the mixture by an adsorbent and recovering a substantially reduced $NO_x$ stream of $N_2O$ stream. The adsorbed $NO_x$ can be recovered from the adsorbent by a number of procedures such as elevating the temperature, reducing the pressure, inert gas purging, water washing or any combination thereof.

BACKGROUND OF INVENTION

Nitric acid oxidation of hydrocarbons is a well known oxidation reaction. This reaction has been applied in chemical industry to produce important chemicals and chemical intermediates such as adipic acid for many years. Unfortunately, this reaction can produce a significant amount of $N_2O$ by-product (~1 mole of $N_2O$ produced per mole of adipic acid produced). NO and $NO_2/N_2O_4$ is also produced in this nitric acid oxidation reaction. The co-existence of NO and $NO_2/N_2O_4$ with $N_2O$ prevents the off-gas from being used in other medical or industrial applications. Furthermore, all of these nitrogen oxides have a significant negative impact on the environment. Presently, all nitric acid oxidation reaction users are required to spend significant amounts of money as capital investment and operating costs to abate their off-gas before the off-gas can be released to the environment.

The status of various off-gas abatement processes in the adipic acid industry and potential new abatement technologies were reviewed by Reimer et al. "Abatement of $N_2O$ Emissions Produced in the Adipic Acid Industry" R. A. Reimer, et al, Environmental Progress, vol. 13, no.2 p.134 (May 1994). Tretijak et al., European Patent, EP 625369; Fetzer et al., German Patents DE 4301470, DE 4224881, DE 4128629 also described various processes and catalysts for decomposing nitrous oxide in nitric acid oxidation off gases by catalytic reactions. EPA technical report EPA-450/3-91-026 provides a review of various $NO_x$ control techniques for nitric acid and adipic acid processes. For use in nitric acid plants, extended absorption, non-selective catalytic reduction and selective catalytic reduction are used most often. For adipic acid plants extended absorption and thermal reduction are used most often.

Badische's FR 1531266, described a process to selectively remove $NO_2$ and $O_2$ from a mixture of nitrogen oxides, and $O_2$ by catalytic reduction with $H_2$ using an $Ag_2O$—$MnO_2$—$Al_2O_3$ catalyst. Using this process, only $NO_2$ and $O_2$ can be removed. NO still co-exists, with $N_2O$; therefore, this stream needs further treatment. Nakai et al., JP 661021 describes a process for refining nitrous oxide from a mixture of other nitrogen oxides and $CO_2$. This process consists of passing the mixture gas through an NaOH absorption tower first and then an $KMnO_4$—NaOH absorption tower in order to remove NO and $NO_2$ from the $N_2O$ stream. However, in this process, due to the interference from $CO_2$, large amounts of NaOH are consumed to remove $NO_x$ as well as $CO_2$. Furthermore, a liquid waste stream is generated which must be further treated.

The prior art does not recognize that an adsorbent can be used to selectively adsorb $NO_2/N_2O_4$ from a mixture of NO, $NO_2/N_2O_4$ and $N_2O$. Nor does the art recognize that a reactive adsorption process can be used to first selectively convert NO in the mixture with an oxidant to $NO_2/N_2O_4$ and then $NO_2/N_2O_4$ can be selectively adsorbed from $N_2O$ in the mixture. Therefore separate $NO_2O$ from other nitrogen oxides in a mixture. By using this reactive adsorption process, both $N_2O$ and the remaining nitrogen oxides can be recovered as useful products and zero waste is generated.

Accordingly, it is an object of the present invention to provide a method for effectively removing a substantial portion of $NO_2/N_2O_4$ from a mixture containing $N_2O$ in a gaseous mixture stream. It is also an object of the invention to provide a reactive adsorption process that can be used to first selectively convert NO in a mixture with an oxidant to produce $NO_2/N_2O_4$ and then to selectively adsorb produced $NO_2/N_2O_4$ from the $N_2O$ in the mixture stream, thus separating the $N_2O$ from other nitrogen oxides. A further object of the invention is to provide a $N_2O$ stream having a significantly reduced $NO_x$ that is suitable for use as a feedstock for other medical or industrial applications and to provide for the recovery of the adsorbed $NO_x$ which can be reconverted to nitric acid. It is also an object of the invention to provide a method which can reduce abatement costs and generate two useful products.

SUMMARY OF INVENTION

Generally, the present invention is a reactive adsorption process for separating $NO_x$ from $N_2O$ in a mixture. The process comprises (A) selectively converting with an oxidant NO in a mixture to $NO_2/N_2O_4$; (B) selectively adsorbing $NO_2/N_2O_4$ from the mixture by contacting same with an adsorbent; and (C) recovering a stream of $N_2O$ having a substantially reduced $NO_x$ concentration. The adsorbed $NO_x$ can be recovered from the adsorbent by elevated temperature, reduced pressure, inert gas purge, water wash or any combination thereof. The advantages of the invention will be better understood with reference to the following detailed description of presently preferred embodiments of the process taken in connection with illustrative examples.

DESCRIPTION OF INVENTION

In a preferred embodiment of the invention $N_2O$ is present as one of the major components of a mixture and other nitrogen oxides and an oxidant are present in minor amounts. The mixture may also comprise minor amounts of such other compounds as CO, $CO_2$, $N_2$, other inert gases or hydrocarbons.

A suitable oxidant for use in the present invention is preferably selected from the group consisting of $O_2$, $O_3$, $H_2O_2$ and $KMnO_4$. An especially preferred oxidant is $O_2$.

The oxidant concentration in the mixture is not critical and can generally be in the range of 0.01% to 40%. A preferred oxidant level is within a range of 0.5% to 21%.

The NO oxidation reaction can be conducted with or without the presence of a catalyst. However, it is preferable to utilize a catalyst for the NO oxidation reaction selected from the group comprising activated carbons, carbon molecular sieves, carbonaceous chars, zeolites, silica gel, activated alumina, manganese oxides, copper oxides, aluminum silicate, carbo alumina gel, iron oxide, nickel oxide, cobalt oxide, various platinum group metals and any combination of thereof. A preferred catalyst is an activated carbon.

The mixture comprising the nitrogen oxides, including oxidant and $N_2O$ can be contacted with the adsorbent by standard methods. A suitable adsorbent for this process is selected from the group comprising activated carbons, carbon molecular sieves, carbonaceous chars, zeolites, silica gel, activated alumina, silicates, clay(s), adsorbent polymers, and any combination thereof. A preferred adsorbent is an activated carbon.

The NO oxidation reaction and the $NO_x$ adsorption can be conducted in two separated steps or in one combined oxidation/adsorption step. The presently preferred embodiment of the process is to conduct the selective oxidation reaction and adsorption in a single step. A suitable material (an oxidation catalyst/adsorbent) for this combined oxidation/reaction step is selected from the group comprising an activated carbon, carbon molecular sieve, carbonaceous char, zeolite, silica gel, activated alumina, silicate, clay(s) or any combination of the above mentioned catalysts with adsorbents. A preferred material to be used in the combined oxidation/adsorption step is an activated carbon.

The process of the invention can be carried out as a batch process, a semi-batch process or a continuous process. In a preferred embodiment, the mixture is contacted with one or more packed-beds of the oxidation catalyst/adsorbent operated in a cyclic mode. For example, the mixture can be passed through a first packed-bed of oxidation catalyst/adsorbent until the oxidation catalyst/adsorbent is nearly saturated with $NO_x$, the mixture can then be diverted to a second packed-bed of oxidation catalyst/adsorbent bed. The $NO_x$ can then be recovered from the nearly saturated bed by reducing the pressure, increasing the bed temperature or a combination of these two. A heated sweep gas such as air may be passed through the saturated bed to facilitate the desorption and recovery of the $NO_x$. The mixture can then be switched between the oxidation catalyst/adsorbent beds allowing for the oxidation catalyst/adsorbent beds to alternate between a reactive adsorption mode and desorption mode, thereby producing a substantially continuous process.

The temperature at which the NO oxidation is conducted is not critical and can generally be less than 300° C. A preferred temperature is within a range of 10° C. to 80° C. The pressure at which the $NO_x$ oxidation is conducted is not critical and can generally be within a range of 0.1 atm to 20 atm. A presently preferred pressure is within a range of 1 atm to 10 atm.

The temperature at which the mixture is contacted with the adsorbent is not critical and generally is less than 180° C. A presently preferred temperature range is within 10° C. to 80° C. The pressure at which the mixture is contacted with the adsorbent is not critical and can generally be within a range of 0.1 atm to 20 atm. A presently preferred pressure range is within 1 atm to 10 atm.

The physical form of the adsorbent is also not critical to the present invention and can be, for example, flakes, chips, pellets or powder.

The reactive adsorption process of the invention selectively reacts and adsorbs nitrogen oxides including NO and $NO_2/N_2O_4$ relative to $N_2O$ in a mixture. This selectivity allows for recovery of $N_2O$ in reduced $NO_x$ concentration. Recovery of the $N_2O$ reduced in other nitrogen oxides can be effected by standard methods for separating gases from solids. In the preferred process using a packed-bed of oxidation catalyst/adsorbent, recovery of the $N_2O$ can consist of collecting the effluent from the column in a suitable container or recompressing the gas for use directly in down-stream processes.

The present process can further comprise recovery of the adsorbed nitrogen oxides by desorption from the adsorbent or the oxidation catalyst/adsorbent. Desorption of the adsorbent or the oxidation catalyst/adsorbent can be effected by standard methods such as temperature swing, pressure swing, inert gas purge, water wash or any combination thereof.

The following examples are provided to illustrate the present invention. These examples are not intended to limit the scope of the claim herein.

EXAMPLE 1

$NO_2$ in $N_2$ Adsorption

A commercially available activated carbon, (BPL, BPL manufactured by Calgon Carbon Corporation, Pittsburgh, Pa.) was crushed and sized to less than 20 mesh and greater than 50 mesh. The sized carbon (0.5 g) was placed into a reactor column having an inside diameter of 6 mm (manufactured in-house). At ambient temperature and ambient pressure, a gas stream was passed through the column at a flow rate of 100.0 sccm/minute. The composition of this gas stream was 1000.0 ppm $NO_2$ in $N_2$. Concentrations were measured with Chemiluminescence Analyzer Model 42C available from Thermo Enviromental Instruments, Inc., Pittsburgh Pa. The column effluent was monitored continuously. The elapsed time required to achieve a 200 ppm $NO_2$ breakthrough was 90.0 minutes. This result indicates significant amount of $NO_2$ being adsorbed.

EXAMPLE 2

NO in $N_2$ Adsorption

Another 0.5 g of the activated carbon (manufactured by Calgon Carbon Corporation, Pittsburgh, Pa.) in the same 20 mesh×50 mesh size range was placed into the reactor described in example 1. At ambient temperature and ambient pressure, a gas stream consisted of 1000.0 ppm NO with balanced $N_2$ was fed through the reactor at a flow rate of 100.0 sccm/minute. Concentrations were measured with Chemiluminescence Analyzer Model 42C available from Thermo Environmental Instruments, Inc., Pittsburgh, Pa. The column effluent was monitored continuously. Within one minute, the NO concentration in the effluent stream was about the same as the NO concentration in the influent stream. This result indicates that activated carbons have very limited adsorption capacity for NO.

EXAMPLE 3

NO with $O_2$ in $N_2$ Adsorption

A third batch of 0.5 g activated carbon (manufactured by Calgon Carbon Corporation, Pittsburgh, Pa.) in the same 20 mesh×50 mesh size range was placed into the reactor described in example 1. At ambient temperature and ambient pressure, a gas stream consisted of 1000.0 ppm NO, 1% O2 and balanced $N_2$ was fed to the reactor at a flow rate of 100.0 sccm/minute. Concentrations were measured with Chemiluminescence Analyzer Model 42C available from Thermo Environmental Instruments, Inc., Pittsburgh, Pa. The column effluent was monitored continuously. The elapsed time required to reach a 200 ppm NO breakthrough was 20.0 minutes. This result indicates that with the existence of $O_2$, NO can be converted to $NO_2/N_2O_4$ first and then be adsorbed by activated carbons functioning as oxidation catalyst/adsorbent.

EXAMPLE 4

NO and $NO_2/N_2O_4$ and $N_2O$ in $N_2$ Adsorption in Activated Carbons

A commercially available activated carbon, (BPL manufactured by Calgon Carbon Corporation, Pittsburgh, Pa.)

was crushed and sized to less than 20 mesh and greater than 50 mesh. The sized carbon (8.18 g) was placed into a reactor column having an inside diameter of 10.2 mm (manufactured in-house). At ambient temperature and 30 psig pressure, a gas stream was passed through this column at a flow rate of 1072.0 sccm/minute. The composition of this gas stream is 2980 ppm $NO_x$ and 26.3% $N_2O$, with balanced $N_2$ ($N_2O/NO_x$=88.3). The column effluent was monitored continuously. Within 2.0 minutes, the NO and $NO_2/N_2O_4$ in the effluent stream concentration reached 630 ppm while the $N_2O$ concentration kept relatively constant at 25.9%. Within 5.0 minutes, the NO and $NO_2/N_2O_4$ concentration (2520 ppm) and the $N_2O$ concentration (25.9%) in the effluent stream were about the same as the NO and $NO_2/N_2O_4$ concentration (2980 ppm) and the $N_2O$ concentration (26.2%) in the influent stream. Concentrations of NO and $NO_2/N_2O_4$ were measured with Chemiluminescence Analyzer Model 42C available from Thermo Environmental Instruments, Inc., Pittsburgh, Pa. $N_2O$ concentrations were measured with Gas Chromatogram Model GC-14A available from Shimadzu Scientific Instruments, Inc., Columbia, Md.

EXAMPLE 5

NO and $NO_2/N_2O_4$, $N_2O$ with $O_2$ in $N_2$ Reactive Adsorption by Carbons

A second batch of 8.18 g activated carbon (manufactured by Calgon Carbon Corporation, Pittsburgh, Pa.) in the same 20 mesh×50 mesh size range was placed into the reactor described in example 4. At ambient temperature and 30 psig pressure, a gas stream consisted of 2650 ppm NO and $NO_2/N_2O_4$, 7% $O_2$ and 27.6% $N_2O$ with balanced $N_2$ ($N_2O/NO_x$=104.1) was fed through this column at a flow rate of 1072.0 sccm/minute. Concentrations of NO and $NO_2/N_2O_4$ were measured with Chemiluminescence Analyzer Model 42C available from Thermo Environmental Instruments, Inc., Pittsburgh, Pa. $N_2O$ concentrations were measured with Gas Chromatogram Model GC-14A available from Shimadzu Scientific Instruments, Inc., Columbia, Md. The column effluent was monitored continuously. In the first 60.0 minutes, the NO and $NO_2/N_2O_4$ concentration in the effluent stream was less than 10.0 ppm while the $N_2O$ concentration in the effluent stream kept relatively constant ($N_2O$ conc.=26.2% and $N_2O/NO_x$=26200.0). The elapsed time required to achieve a 250 ppm NO and $NO_2/N_2O_4$ breakthrough ($N_2O/NO_x$=1048) was 198.0 minutes.

EXAMPLE 6

NO and $NO_2/N_2O_4$, $N_2O$ with $O_2$ in $N_2$ Reactive Adsorption by Silica Gel A commercially available silica gel (manufactured by W.R. Grace Co. in Baltimore, Md.) was crushed and sized to less than 20 mesh and greater than 50 mesh. The sized silica gel (12.77 g) was placed into a reactor column having an inside diameter of 10.2 mm (manufactured in-house). The silica gel was first dried at 175° C. under $N_2$ flow condition for 1 hour and then cooled down to ambient temperature. At ambient temperature and 30 psig pressure, a gas stream was passed through this column at a flow rate of 1072.0 sccm/minute. The composition of this gas stream was 2850 ppm No and $NO_2/N_2O_4$, 7.0% $O_2$ and 26.3% $N_2O$ ($N_2O/NO_x$=92.3), with balanced $N_2$. Concentrations of NO and $NO_2/N_2O_4$ were measured with Chemiluminescence Analyzer Model 42C available from Thermo Environmental Instruments, Inc., Pittsburgh, Pa. $N_2O$ concentrations were measured with Gas Chromatogram Model GC-14A available from Shimadzu Scientific Instruments, Inc., Columbia, Md. The column effluent was monitored continuously. In the first 10.0 minutes, the NO and $NO_2/N_2O_4$ concentration in the effluent stream was less than 490.0 ppm while the $N_2O$ concentration in the effluent stream kept relatively constant ($N_2O$ conc.=25.6% and, $N_2O/NO_x$=522). It took about 38 minutes to have the NO and $NO_2/N_2O_4$ concentration in the effluent stream to reach the NO and $NO_2/N_2O_4$ concentration level in the inffluent stream.

EXAMPLE 7

Regeneration and Readsorption

The BPL carbon bed from example 5 was regenerated by reducing the pressure to ambient pressure first. Then an air stream with a flow rate of 1072.0 sccm/minute, at ambient temperature and ambient pressure, was passed through the carbon bed for 35.0 minutes. After regeneration, the same feed gas ($N_2O/NO$ and $NO_2/N_2O_4$=104.1) used in example 5 was again fed to the carbon bed. The $NO_x$ concentration in the effluent stream was less than 150.0 ppm while the $N_2O$ concentration in the effluent stream kept relatively constant for the first 25.0 minutes. The elapsed time required to reach a 250.0 ppm NO and $NO_2/N_2O_4$ breakthrough ($N_2O/NO$ and $NO_2/N_2O_4$=1048) was 43.0 minutes. Concentrations of NO and $NO_2/N_2O_4$ were measured with Chemiluminescence Analyzer Model 42C available from Thermo Environmental Instruments, Inc., Pittsburgh, Pa. $N_2O$ concentrations were measured with Gas Chromatogram Model GC-1A available from Shimadzu Scientific Instruments, Inc., Columbia, While presently preferred embodiments of the invention have been described in particularity, the invention may be otherwise embodied within the scope of the appended claims.

What is claimed is:

1. A process for separation of $N_2O$ from a mixture comprising NO, said process comprising:
   A) selectively converting with an oxidant NO in said mixture to $NO_2/N_2O_4$;
   B) selectively adsorbing said $NO_2/N_2O_4$ from said mixture by contacting said mixture with an adsorbent; and
   C) recovering said $N_2O$ having substantially reduced $NO_x$ concentration of other nitrogen oxides therewith.

2. A process according to claim 1, further comprising the step of (D) recovering said adsorbed $NO_x$ by remove said adsorbed $NO_x$ from said adsorbent.

3. A process according to claim 1, wherein said $N_2O$ is present in the mixture as a major component and the $NO_x$ is present in the mixture as a minor component.

4. A process according to claim 1, wherein said oxidant is selected from the group consisting of $O_2$, $O_3$, $H_2O_2$, and $KMnO_4$.

5. A process according to claim 1, wherein said oxidant is $O_2$.

6. A process according to claim 1, wherein said oxidant concentration in said mixture is from about 0.01% to 40% by volume.

7. A process according to claim 1, wherein said oxidant concentration in said mixture is from about 0.05% to 21% by volume.

8. A process according to claim 1, wherein said NO oxidation is conducted at a temperature less than 300° C.

9. A process according to claim 1, wherein said NO oxidation is conducted at a temperature from about 10° C. to 80° C.

10. A process according to claim 1, wherein said NO oxidation is conducted at a pressure from about 0.1 atm to 20 atm.

11. A process according to claim 1, wherein said NO oxidation is conducted at a pressure from about 0.5 atm to 10 atm.

12. A process according to claim 1, wherein said mixture is contacted with said adsorbent at a temperature less than 180° C.

13. A process according to claim 1, wherein said mixture is contacted with said adsorbent at a temperature from about 10° C. to 80° C.

14. A process according to claim 1, wherein said mixture is contacted with said adsorbent at a pressure from about 0.1 atm to 20 atm.

15. A process according to claim 1, wherein said mixture is contacted with said adsorbent at a pressure from about 1 atm to 10 atm.

16. A process according to claim 1, wherein said conversion of NO takes place in gas phase.

17. A process according to claim 1 wherein the mixture further comprises $NO_2/N_2O_4$.

18. A process for separation of $N_2O$ from other nitrogen oxides in a mixture, said process comprising:
  A) selectively converting with an oxidant reduced nitrogen oxides of said mixture;
  B) selectively adsorbing said oxidized nitrogen oxides from said mixture by contacting said mixture with an adsorbent; and
  C) recovering said $N_2O$ having substantially reduced concentration of other nitrogen oxides therewith.

19. A process according to claim 1, wherein said NO oxidation reaction and said $NO_x$ adsorption are conducted in two separated steps.

20. A process according to claim 1, wherein said mixture is contacted with one or more packed-beds of said adsorbent or said oxidation/adsorbent operated in a cyclical mode.

21. A process according to claim 20, wherein said mixture is contacted to said packed-beds in a cyclical mode of operation.

22. A process according to claim 1, wherein no catalyst is used in step (A) or said conversion of NO takes place in gas phase.

23. A process according to claim 1, wherein a catalyst is used in step (A).

24. A process according to claim 23, wherein said catalyst is selected from the group consisting of activated carbons, carbon molecular sieves, carbonaceous chars, zeolites, silica gel, activated alumina, manganese oxides, copper oxides, aluminum silicate, carbo alumina gel, iron oxide, nickel oxide, cobalt oxide, platinum group metals and any combination thereof.

25. A process according to claim 23, wherein said catalyst is an activated carbon.

26. A process according to claim 1, wherein said adsorbent is selected from the group consisting of activated carbons, carbon molecular sieves, carbonaceous chars, zeolites, silica gel, silicates, clays, activated alumina, adsorbent polymers and any combination thereof.

27. A process according to claim 1, wherein said adsorbent is an activated carbon.

28. A process according to claim 18, further comprising the step of (D) recovering said adsorbed nitrogen oxides by removing said adsorbed nitrogen oxides from said adsorbent.

29. A process according to claim 2 or 28, wherein desorption of said adsorbed nitrogen oxides from said adsorbent material is conducted by changing reaction conditions according to a procedure selected from the group consisting of elevating temperature, reducing pressure, inert gas purging, water washing and any combination thereof.

30. A process according to claim 29, wherein said adsorbed nitrogen oxides are desorbed from said adsorbent material and an oxidation catalyst in combination.

31. A process according to claim 30, wherein a material is used to catalyze said oxidation reaction and wherein said adsorbent material is the same as said catalyst.

32. A process according to claim 31, wherein said adsorbent material is the same as said oxidation catalyst and is an activated carbon.

33. A process according to claim 29, wherein nitrogen oxides are desorbed from an oxidation catalyst.

34. A process according to claim 1, wherein said NO oxidation reaction and said $NO_x$ adsorption are conducted in a single combined step.

35. A process according to claim 34, wherein a material is used to catalyze said oxidation reaction and wherein said adsorbent material is the same as said catalyst.

36. A process according to claim 35, wherein said material used to catalyze said oxidation reaction is also the adsorbent material used in said single combined oxidation reaction and adsorption step and is selected from the group consisting of activated carbons, carbon molecular sieves, carbonaceous chars, zeolites, silica gel, silicates, clays, activated alumina, and any combination of the foregoing materials.

37. A process according to claim 34, wherein said material used to catalyze said oxidation reaction and adsorbent material used in said single combined oxidation reaction and adsorption step is an activated carbon.

38. A process for separation of $N_2O$ from nitrogen oxides in a mixture, the process comprising:
  (A) selectively converting nitrogen oxides in said mixture to $NO_2/N_2O_4$ using an oxidant having a concentration level falling within a range of about 0.5% to 21% of said mixture by contacting the nitrogen oxides with an oxidation catalyst that is also an adsorbent material at a temperature from about 10° C. to 80° C. at a pressure from about 1 atm to 10 atm;
  (B) selectively adsorbing said $NO_2/N_2O_4$ by contacting said $NO_2/N_2O_4$ with said oxidation catalyst;
  (C) recovering said $N_2O$ having substantially reduced concentration of other nitrogen oxides; and
  (D) recovering any adsorbed nitrogen oxides by removing said nitrogen oxides from said oxidation catalyst by changing reaction conditions according to a procedure selected from the group consisting of elevating temperature, reducing pressure, inert gas purging, water washing, and any combination thereof.

* * * * *